Figures 1, 2:
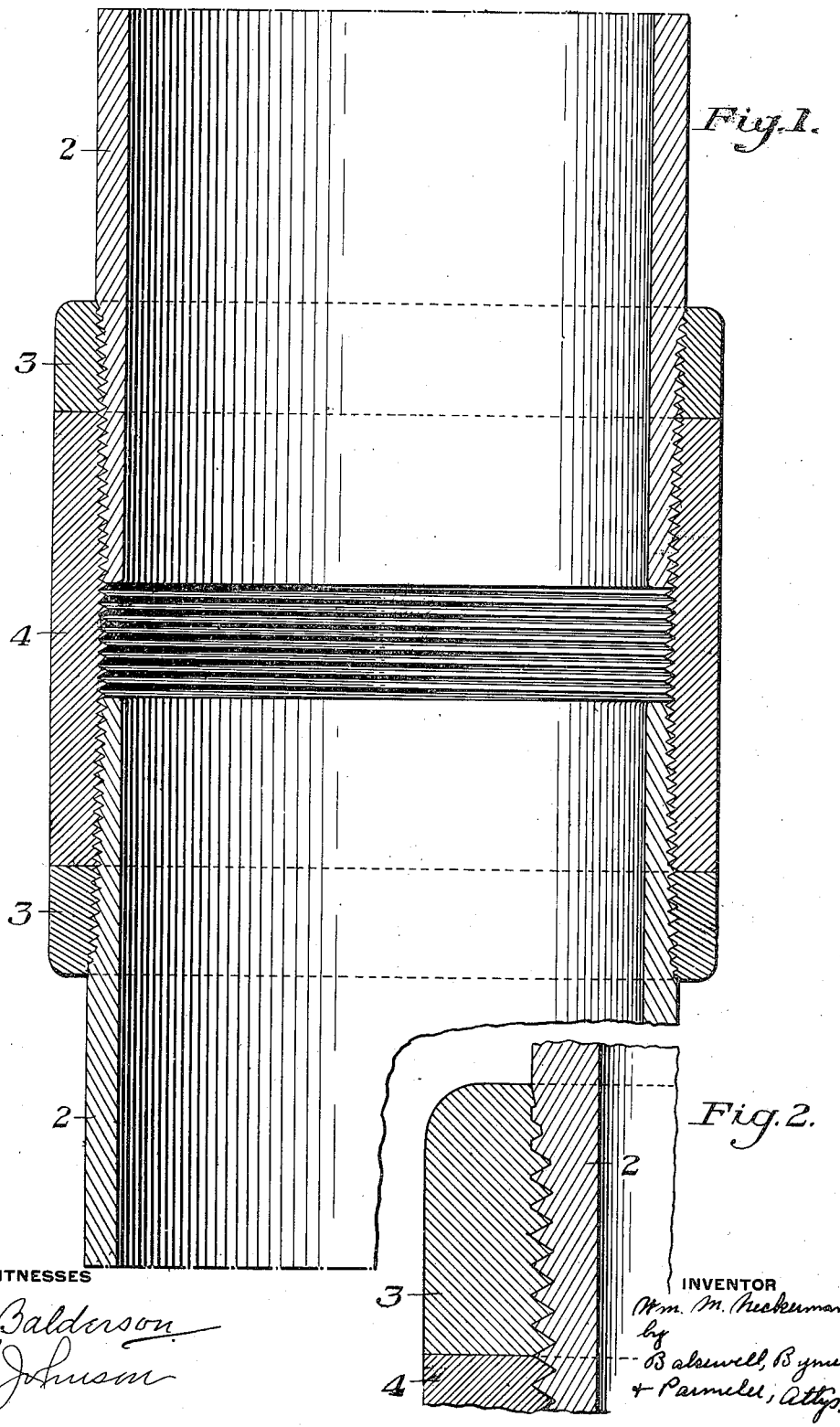

W. M. NECKERMAN.
COUPLING FOR DRILL PIPES.
APPLICATION FILED SEPT. 27, 1916.

1,254,927.

Patented Jan. 29, 1918.

WITNESSES
R. A. Balderson
L. H. Johnson

INVENTOR
Wm. M. Neckerman
by
Bakewell, Byrnes
& Parmelee, Attys.

UNITED STATES PATENT OFFICE.

WILLIAM M. NECKERMAN, OF YOUNGSTOWN, OHIO, ASSIGNOR TO THE YOUNGSTOWN SHEET & TUBE COMPANY, OF YOUNGSTOWN, OHIO, A CORPORATION OF OHIO.

COUPLING FOR DRILL-PIPES.

1,254,927. Specification of Letters Patent. Patented Jan. 29, 1918.

Application filed September 27, 1916. Serial No. 122,388.

*To all whom it may concern:*

Be it known that I, WILLIAM M. NECKERMAN, a citizen of the United States, residing at Youngstown, in the county of Mahoning and State of Ohio, have invented a new and useful Improvement in Couplings for Drill-Pipes, of which the following is a full, clear, and exact description, reference being had to the accompanying drawings, forming part of this specification, in which—

Figure 1 is a longitudinal section through the ends of two pipe sections and the coupling members, Fig. 2 is an enlarged detail sectional view of one of the locking rings.

This invention relates to an improvement in couplings for drill pipes, and is designed to provide a cheap and efficient device of this character which is so arranged that the joints will not materially tighten when the drill strikes a boulder during the drilling operation and which is so arranged that the weakest portion of the pipe is reinforced by the coupling members, so that there is no danger of twisting-off the pipe at the threaded portion, which is the weakest part thereof.

As is well known to those familiar with the art, drill pipes of this character are subjected to severe stresses and strains when the fish-tail or other bit connected to the lower end of the pipe strikes hard formations, boulders, etc., which strains are transmitted to the various couplings through the pipe sections. When these shocks are encountered, the joints of the old couplings are naturally screwed up to such an extent that the threads in the coupling sleeves or the threads on the pipes are mutilated and destroyed, so that it is necessary to repair the threads on either the coupling members or the pipes, or both, before the same can be used again. At other times, the threads may not be tightened to any appreciable degree, but one of the sections of the pipe will break off along the threads of the pipe between the end of the thread and the end of the threaded portion of the coupling, which is the weakest portion of the coupling.

The object of my invention is to provide a coupling which is arranged to overcome the above difficulties and comprises a coupling-sleeve and a plurality of locking rings, one on each of the pipe sections to be joined. The threads in the locking rings, as well as the ends of the threads on the pipe sections, are so arranged that after the locking rings have been screwed home on the threads of the pipe sections, they will be so seated that there will be no danger of screwing the rings beyond this point. The coupling sleeve is then abutted against the faces of the locking rings in such a manner that the rings act as the lock nuts for the coupling sleeves.

The precise nature of my invention will be best understood by reference to the accompanying drawings, which will now be described, it being understood, however, that changes may be made in the details thereof without departing from the spirit and scope of the invention, as defined in the appended claims.

In these drawings, the reference character 2 designates the pipe sections, 3 the locking rings and 4 the coupling.

The pipe sections are provided with tapered threads, the ends thereof having flat crowns and roots, as clearly indicated in the drawings. The locking rings are also provided with tapered threads, while the threads at one end thereof are provided with flat crowns and flat roots which are arranged to engage the similarly shaped threads on the pipe sections. The coupling sleeve is provided with inwardly extending tapered threads at both ends for the reception of the ends of the threaded pipe sections, which threads form continuations of the threads in the locking rings.

The coupling is assembled by first applying the locking rings to the pipe sections, then applying the coupling member to one of the sections, and then applying the second section and screwing the parts home.

I desire it to be understood that this type of coupling is adaptable for connecting various types of members to each other, such as shaft sections, etc.

The advantages of my invention result from the provision of a joint or coupling for drill rod pipe sections having a locking ring on each pipe section, which is provided with threads which differ in cross section at one end of the ring from the cross section of the threads at the other end of the ring and are arranged to engage similar threads on the pipe sections, together with a coupling sleeve for connecting the pipe sections to each other, which sleeve is arranged to abut one face of each of the locking rings. By this arrangement, I am enabled to prevent the screwing up of the parts beyond a predetermined point and at the same time provide means for covering the entire threaded portions of the pipe sections by means of the threaded portion of the coupling members, and thereby prevent the breaking of the pipe along the line of the thread thereon.

I claim:

1. A pipe coupling of the character described, comprising pipe sections having threaded ends, the inner end portions of the thread having flattened crowns and roots, a locking ring on the end of each pipe section and covering one end of the thread thereon, the entering portions of the threads of said rings also having flattened crowns and roots to seat on the flattened crowns and roots of the inner end portions of the threads on the pipe sections, and a threaded coupling sleeve connecting the inner ends of the pipe sections to each other and engaging one face of each locking ring; substantially as described.

2. A pipe coupling of the character described, comprising pipe sections having tapered threads on the ends thereof, a locking ring having a tapered internal thread on the end of each pipe section and covering one end of the thread thereon, and a coupling sleeve having tapered threads therein connecting the ends of the pipe sections to each other and engaging both locking rings, some of the threads in the outer ends of the locking rings differing in cross section from the cross section of the threads at the inner ends of said rings; substantially as described.

In testimony whereof, I have hereunto set my hand.

WILLIAM M. NECKERMAN.

Witnesses:
FRANK PURNELL,
R. M. WELCH.

Copies of this patent may be obtained for five cents each, by addressing the "Commissioner of Patents, Washington, D. C."